(12) United States Patent
Sumiyoshi et al.

(10) Patent No.: US 6,560,400 B1
(45) Date of Patent: May 6, 2003

(54) VIDEO INFORMATION EDITING METHOD AND SYSTEM, AND RECORDING MEDIUM HAVING THE EDITING METHOD STORED

(75) Inventors: Masanori Sumiyoshi, Kodaira (JP); Hirotada Ueda, Kokubunji (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/112,344

(22) Filed: Jul. 9, 1998

(30) Foreign Application Priority Data

Jul. 10, 1997 (JP) ............................... 9-185200

(51) Int. Cl.[7] .......................... G11B 27/00; H04N 5/91
(52) U.S. Cl. ....................... 386/52; 386/55; 386/68
(58) Field of Search .............................. 386/52, 54, 55, 386/46, 39, 68, 67, 75, 96, 106, 4, 6, 7; 360/32; G11B 27/00; H04N 5/91

(56) References Cited

U.S. PATENT DOCUMENTS 4,317,131 A * 2/1982 Jerome
5,377,051 A * 12/1994 Lane et al.
5,572,496 A * 11/1996 Hayashi et al.

FOREIGN PATENT DOCUMENTS

| JP | 799634 | 4/1995 |
| JP | 8186794 | 7/1996 |
| JP | 946646 | 2/1997 |
| JP | 9167445 | 6/1997 |
| JP | 9186974 | 7/1997 |

* cited by examiner

Primary Examiner—Robert Chevalier
(74) Attorney, Agent, or Firm—Antonelli, Terry, Stout & Kraus, LLP

(57) ABSTRACT

A method of editing digital video information including a plurality of video image data and audio data associated with each of the video image data, having the steps of selecting a frame reading pattern from some reproduction patterns stored in a memory according to a specified reproduction mode of video information, reading the video image data from a video image data source according to the selected frame reading pattern, reading the audio data from an audio data source according to an audio reading pattern corresponding to the frame reading pattern, producing the read video image data at a predetermined frame rate, and producing the read audio data in synchronism with the produced video image data.

4 Claims, 8 Drawing Sheets

| | ONE SECOND | | | | | | |
|---|---|---|---|---|---|---|---|
| READ FRAME | 1 | 2 | 3 | 4 | 5 | 6 | 7 |
| NUMBER OF TIMES OF READING | 5 | 4 | 4 | 4 | 4 | 4 | 5 |

FIG.3B

| | ONE SECOND | | | | | | |
|---|---|---|---|---|---|---|---|
| READ FRAME | 1 | 2 | 3 | 4 | 5 | 6 | 7 |
| NUMBER OF TIMES OF READING | 5 | 4 | 4 | 5 | 4 | 4 | 4 |

TIME ⟶

FIG.11

| FRAME TO BE SENT OUT | 1 | 2 | 3 | 4 | 5 | 6 | 7 | 8 | --- | 63 | 64 | 65 | 66 | 67 | 68 | 69 |
|---|---|---|---|---|---|---|---|---|---|---|---|---|---|---|---|---|
| NUMBER OF TIMES OF SENDING | 1 | 1 | 1 | 0 | 1 | 0 | 0 | 1 | --- | 0 | 0 | 1 | 0 | 0 | 1 | 0 |

VIDEO INFORMATION EDITING METHOD AND SYSTEM, AND RECORDING MEDIUM HAVING THE EDITING METHOD STORED

BACKGROUND OF THE INVENTION

The present invention relates to a method of, and system for, editing video information including video image frame data and audio sample data, and particularly to the techniques for editing images and sounds such as television broadcast programs, video image works, animation products, recorded images of TV phone or video data produced by computer in order to be reproducible at different speeds from the standard record/reproduce speed.

In the conventional TV program production, a plurality of video tape recorders and video monitors are used, and the video image data and audio data recorded in the original tapes are edited by repeating the first forward or rewinding operations while watching the tape counters and monitor screens. In recent years, a computer has been introduced in the television broadcast program production facilities and video soft production equipment, making it possible to edit highly efficiently and functionally.

According to the video information editing using a computer, the video image data and audio data are converted into digital signals and recorded in a memory unit such as a magnetic hard disk unit.

Figure 8:
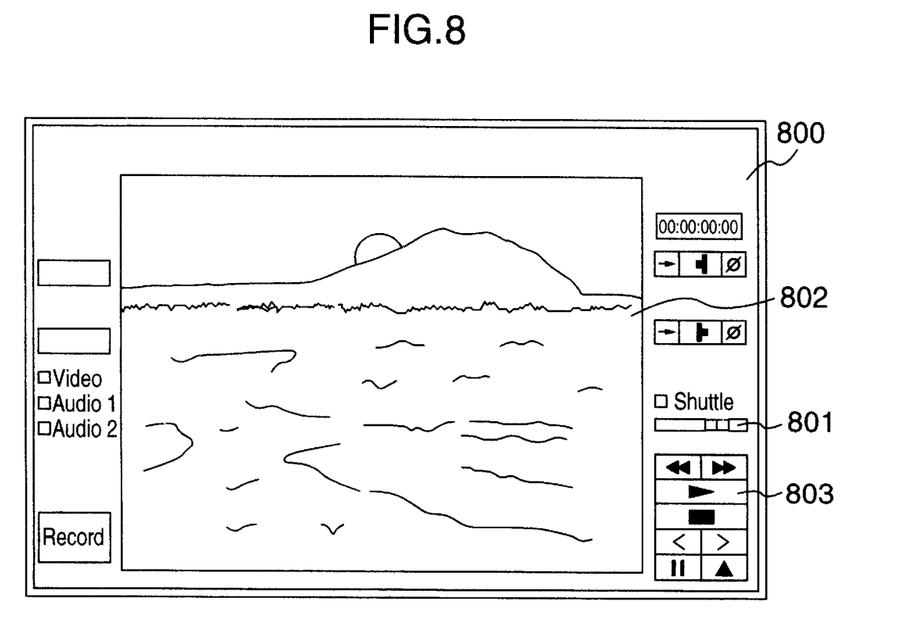
FIG. 8 shows an editing image and control window displayed on the display screen of a video information editing system.

The video information editing system using a hard disk unit, when operated to edit moving pictures of images and sounds, generally produces, as for example shown in FIG. 8, an operation panel, a control window 800 and a moving picture 802 being edited on a display monitor connected to a system control computer which constitutes the video information editing system, according to editing software.

The user operates the mouse connected to the system control computer to put the cursor on a slider 801, a push button 803 and so on displayed on the operation panel and control window 800, and then, for example, clicks or drugs the cursor on the display monitor, thereby editing the video data.

The video information editing system has a reproduce function (preview) provided to confirm the recorded contents of the hard disk unit and the edited picture and sound. That is, at the time of editing, an image is displayed on the monitor and sound is produced from the speaker connected to the system control computer on the basis of the video image data and audio data recorded on the hard disk unit and under the software control as described above, thus those contents being confirmed.

In this video information editing system, the video image data and audio data recorded on the hard disk unit are reproduced at the standard speed by successively producing the video image signal and audio signal to the display monitor and speaker in the order of frames while the video image data and audio data are synchronized at each frame which constitutes a moving picture.

In the conventional video information editing operation using tape recorders, the video information can be easily reproduced at a different speed from the standard speed, for example, in the slow speed mode or fast speed mode by changing the tape transport speed (change of frame rate). However, the video information data recorded in a form of digital data on the hard disk unit cannot be reproduced in the slow speed mode or fast speed mode by changing the rotation speed of the hard disk unit, because the hard disk unit must always be operated at a constant revolution speed.

Here, we will define the term "reproduction speed" used in this specification as below. The reproduction at the standard speed is that the frame images picked-up or recorded at a predetermined frame rate are reproduced at the same frame rate. When the frame images photographed at a rate of, for example, 30 frames per second are reproduced at the same frame rate of 30 frames per second, the reproduced images move at the same content speed (speed of contents) as the original images, or at the standard speed. The slow speed reproduction mode is the way to reproduce so that the reproduced images can move more slowly than those reproduced at the standard speed. The fast speed reproduction mode is the way to reproduce so that the reproduced images can move more faster than those reproduced at the standard speed.

SUMMARY OF THE INVENTION

It is an object of the present invention to provide a method and system for editing so that the video information recorded in a digital form in a hard disk unit or the like can be reproduced at a different speed from the standard reproduction speed, and a recording medium with the editing method program recorded.

According to the present invention, there is provided a method of editing digital video information including a plurality of frame image data and audio sample data associated with each frame image data. In the editing method and editing system of the present invention, when a mode of reproduction speed for video images is specified, a frame reading pattern described later is selected from the reproduction patterns (frame reading patterns) stored in a memory, frame image data is read out of a video image data source according to the selected frame reading pattern, audio sample data is read out of an audio data source according to the frame reading pattern, the read frame image data is produced at a predetermined frame rate, and the read audio data is produced in synchronism with the produced frame image data.

In addition, there is provided a recording medium in which a program for the editing method is previously recorded in a form of program code which can be read by a computer. This recording medium is, for example, a magnetic disk, an optical disk or a semiconductor memory.

According to the video information editing method of the present invention, the audio data is read from the audio data source in accordance with the predetermined frame reading pattern, the data is processed and outputted in synchronism with the frame image when the video data is reproduced at a different speed from the standard reproduction speed. Accordingly, the editor can listen the reproduced sound with shifted audio frequency band in non-standard speed reproduction mode (a slow or fast speed mode). That is, the frequency of reproduced sound in a slow speed mode has been shifted to lower frequency band than the sound frequency band of standard speed mode. Meanwhile the frequency of reproduced sound in a fast speed mode has been shifted to higher frequency band than the sound frequency band of standard speed mode. The shift of the frequency band depends on the speed ratio between the speeds of non-standard mode and standard mode. Such sound reproduction in the non-standard mode of the present invention gives to the editor or user a feeling similar to the sound reproduction in non-standard speed mode of the video tape recorder. The user can edit the digital video data from the hard disks in the feeling same as that of editing work with the video tape recorder. Unnecessary distortion in the reproduced sound of non-standard mode can be reduced. The viewer, who watches the pictures from the edited video data, can listen smooth sound corresponding to the reproduced images in non-standard speed mode.

DESCRIPTION OF THE PREFERRED EMBODIMENTS

Some reproduction modes such as slow speed reproduction mode and fast speed reproduction mode can be considered in the method of editing by use of a computer the video information which is previously recorded in the hard disk unit in a form of digital signal.

There is a method of selecting video image frame data and audio sample data for each video frame and producing as video image signal and audio signal to display monitor and speaker. For example, of a series of frames succeeding during each predetermined period of time, video image frame data and audio sample data of a certain-numbered frame from the head of the series are selected and produced at each predetermined period of time, and video image frame data and audio sample data of a certain-numbered frame of the other frames of the series is not produced. In addition, a method of rearranging each data of the selected frames so that the data is produced in a certain order is employed to perform the slow reproduction and fast forward reproduction.

In other words, in the slow speed reproduction mode, video image data and audio data of the predetermined same-position frames in each period are repeatedly produced a certain number of times. In the fast forward reproduction mode, video image data and audio data of a series of frames in each predetermined period are thinned by removing some frames from those data, and the thinned data are produced.

An example of the way to produce audio signal according to the moving picture reproduction speed will be described with reference to the flowchart of FIG. 4.

In the later description, it is assumed that the frame rate of video image signal produced from the video information editing system using a hard disk unit is 30 frames per second and that the sampling frequency of the audio signal is 44.1 kHz which is the same as in the specification of CD (compact disk).

First, the video data reproduction speed (equal to or below or higher than normal speed, and of positive or negative direction of reproducting) is determined for the slow or fast speed reproduction mode to be performed in preview (see step 101 in FIG. 4).

Figure 4:
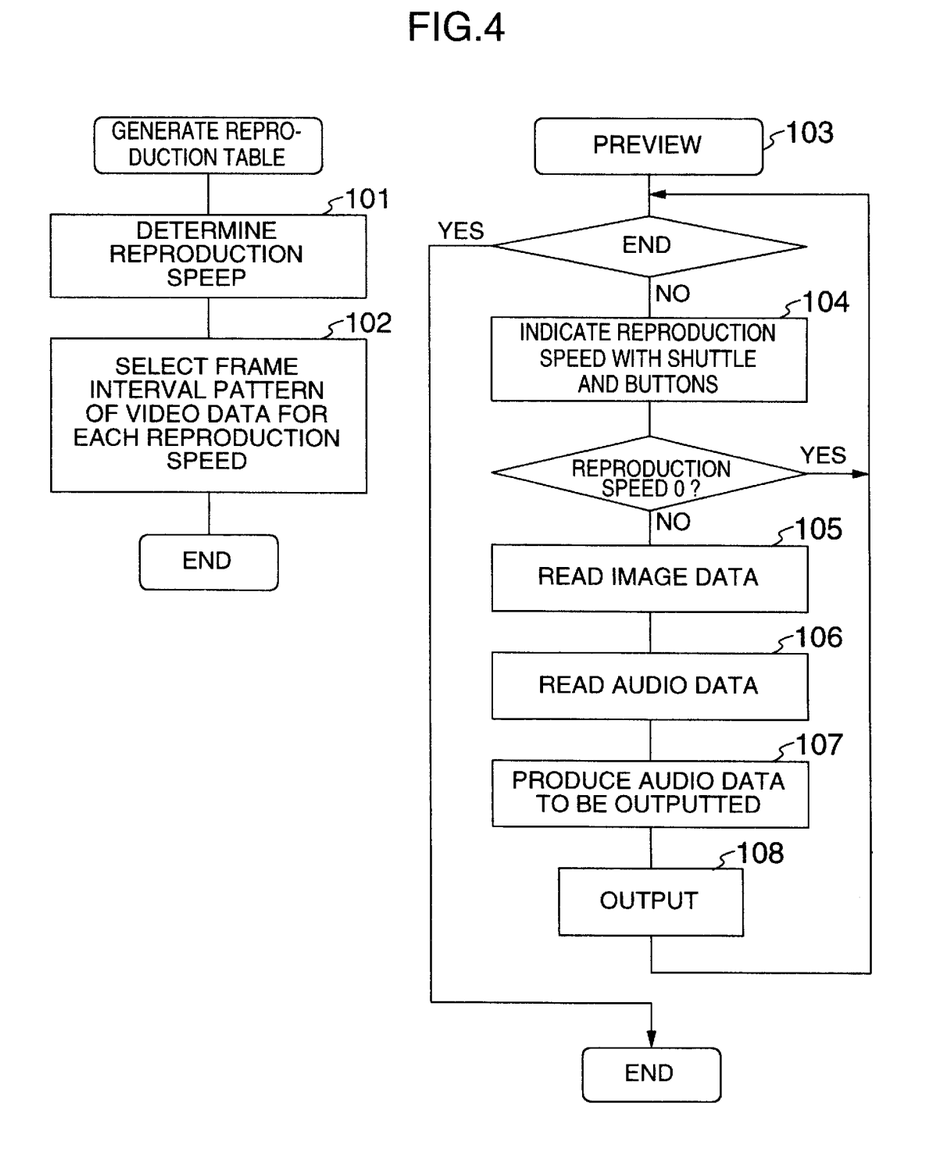
FIG. 4 is a flowchart of the embodiment of the video information editing method of the present invention.

Then, the frame output order pattern (frame reading pattern) for video image data (frame image data) is determined in order to reproduce video data at the decided reproduction speed (see step 102 in FIG. 4).

If this reproduction speed is the slow speed reproduction speed of $15/30$ ($=\frac{1}{2}$) time normal, it is necessary that video image data of 15 frames is produced as video image data of 30 frames per second. In this case, the output pattern is, for example, required to interpolate so that each of first frame to 15th frame can be produced twice.

In addition, if the fast speed reproduction speed is $45/30$ ($=1.5$) times normal, the video image data of 45 frames are required to produce as the video image data of 30 frames per second. Therefore, some 15 frames in the 45 frames must be removed from the original video image data by thinning.

In the above two examples, the frames to be interpolated and frames to be removed can be determined by a relatively simple rule. Specifically, for the former slow speed reproduction, the same frame is produced successively twice, and for the latter fast speed reproduction, the frames are thinned once at every three frames, that is, the same processing is performed for each whole number of frames.

However, the above relatively simple rule cannot be applied to the interpolation and thinning processes for some reproduction speeds. In that case, an output order pattern having a complex rule must be previously provided in a form of table from the video frames of the associated reproduction speed.

If the slow speed reproduction speed is 4/30 time normal which requires a complex rule, it is necessary that video image data of four frames be selected from the original data of 30 frames per second and processed to be a rate of 30 frames per second. The output pattern for the each-frame interpolation will be considered to repeat the first frame and third frame eight times and the second frame and fourth frame seven times (or those numbers of times are reversed).

As against this video frame output pattern, the conventional audio output pattern is performed to equally interpolate each audio frame data of the first frame and third frame eight times and each audio frame data of the second frame and fourth frame seven times, so that the audio data of each frame can be produced in synchronism with the video image data.

Moreover, if the fast speed reproduction speed is 69/30 times normal (namely, thinning process is performed), the video image data of 69 frames of the video image data, one of which is produced at a rate of 30 frames per second is processed as the video image data of 30 frames per second.

Therefore, the remainder of subtracting 30 frames from 69 frames, or each 39 frames of video image data is removed by thinning from the original data. As to how to remove 39 frames by thinning from the 69 frames, it can be considered that, for example, 39 frames are respectively removed at nearly equal intervals from all the frames, 69 frames in each predetermined period, or that the frames of each predetermined period is thinned at nearly equal intervals.

Figure 5:
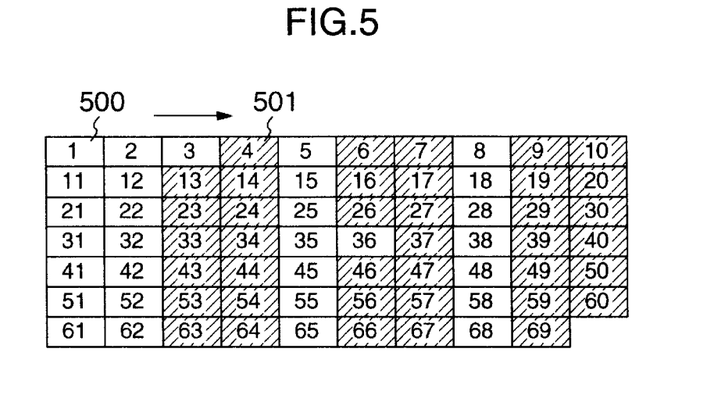
FIG. 5 shows an example of the reading pattern for producing video image data and audio data in the fast speed reproduction mode according to the embodiment of the video information editing method of the present invention.

FIG. 5 shows one example of the reading pattern in the case when the video frame data is read from a memory at a fast speed reproduction speed of 69/30 times normal. In FIG. 5, the numbers attached to the divisions indicate frame numbers. The frames corresponding to the hatched divisions are not read out. The arrow indicates the order in which the necessary frames are read out in that direction. Data is read in the order of the first frame, second frame and third frame, but the fourth frame is not read. In addition, the fifth frame is read, but the sixth frame and seventh frame are not read. Then, the eighth frame is read, but the ninth frame and tenth frame are not read. Moreover, after the eleventh frame and twelfth frame are successively read, the following frames are read according to the illustrated pattern.

Thus, when the frames corresponding to the hatched divisions, as generally represented by reference numeral 501 in FIG. 5, are left not read out or removed for thinning, or when only the remaining frames corresponding to the non-hatched divisions, as generally represented by reference numeral 500, are produced, video image data can be reproduced at a rate of 69/30 times normal.

The audio data can be edited as follows according to the video image data of 69/30 (2.3)-times-normal speed reproduction speed. In the first method, the audio data (audio frame data) corresponding to the hatched divisions of the 69 frames in FIG. 5 are removed from the audio data corresponding to all the frames 69, and the remaining audio frame data corresponding to the non-hatched divisions are left.

In the second method, the audio data in each predetermined period are successively read independently of the pattern. For example, audio frame data of 31th frame to 69th frame are removed for thinning, and audio frame data of the first frame to 30th frame are left or produced.

When the video image data recorded in a form of digital signal in a hard disk unit is reproduced in the slow speed mode or fast speed mode, the same frame data is repeatedly read to interpolate, or specified frame data is removed for thinning. If some frames of each audio frame data is also interpolated or removed for thinning in association with the slow speed reproduction mode or fast speed reproduction mode of video image data, the reproduced audio data will result in the fact that the same speech or sound is repeated or that audio information is interrupted. In that case, the reproduced sound will be unnatural and difficult to hear.

According to the embodiment of a video information editing system of the present invention with the above problems solved, a table of output order pattern is produced for editing depending on the frame image data output, and used as a table for editing audio data of, at least, several units per sample at a time. The sampled audio data is reproduced in the same pattern as the video image data output, so that the video image output pattern and sound output pattern can be matched with each other. Thus, even in the slow speed reproduction mode or fast speed reproduction mode, the reproduced sound can be heard without feeling of wrongness and with interruption greatly reduced.

Figure 9:
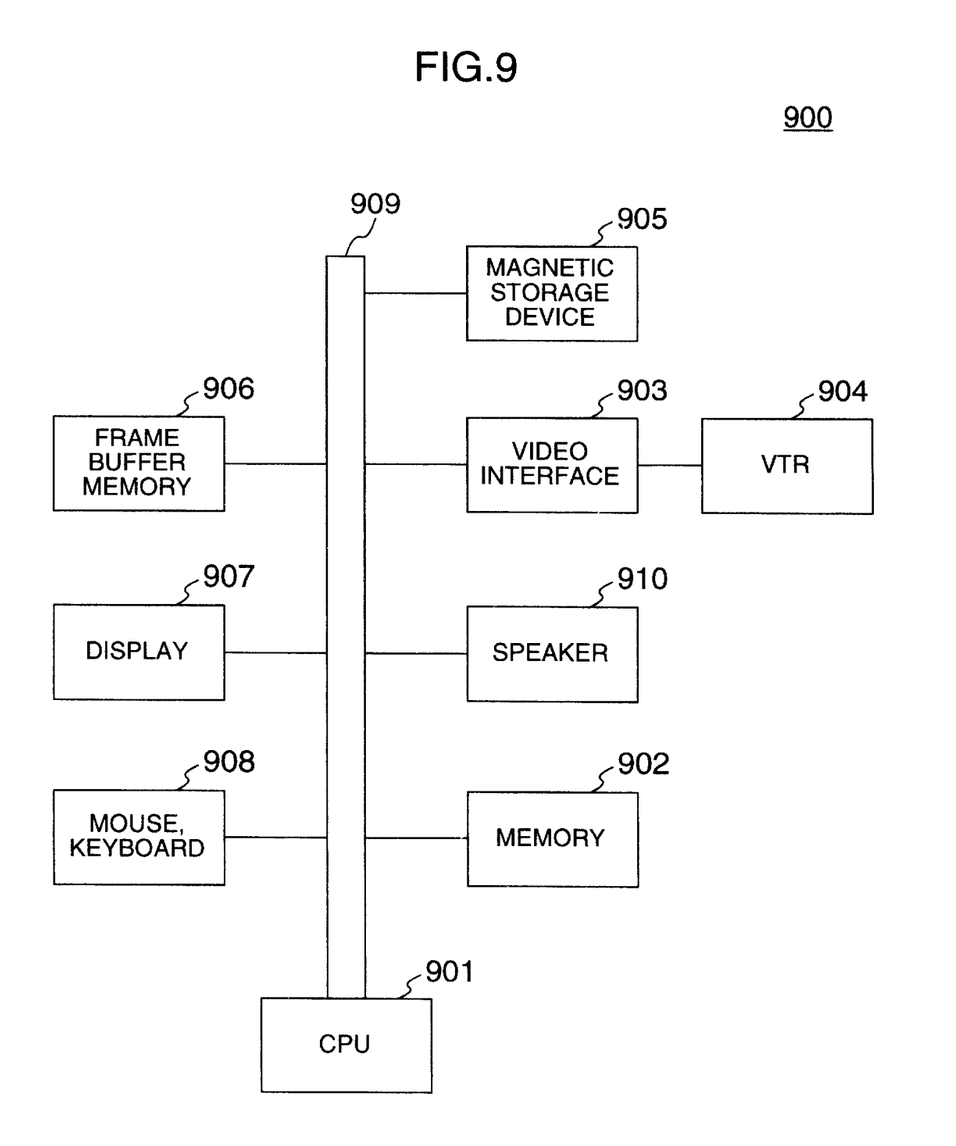
FIG. 9 is a block diagram of an embodiment of an editing system for executing the video information editing method of the present invention.

FIG. 9 is a block diagram of one example of the construction of a video information editing system for executing the video information editing method of the invention.

The video information editing system, 900 includes a CPU (central processing unit) 901 for processing various aspects of control in the video information editing system 900, a display monitor 907 for displaying image information of scene and cut useful for editing images, and a control window to be used for editing the image information, a speaker 910 for sounding audio information corresponding to the image information a memory 902 for storing various different control programs which the CPU 901 executes, a magnetic storage device 905 for storing image information to be edited, using, for example, hard disks which is able to make random access, a frame buffer memory 906 for storing the image information to be indicated on the display monitor 907 and the audio information to be sounded at the speaker 910, a mouse (or keyboard) 908 for various different control inputs, a video tape recorder (VTR) 904 for supplying the video information as video material to be edited, and a video interface 903 for enabling the video information from the VTR 904 to be inputted in this system. The CPU 901, memory 902, video interface 903, magnetic storage device 905, frame buffer memory 906 and so on are connected to a bus 909, and thus the CPU 901 can control those elements through the bus.

If the video information editing system is constructed to record and reproduce compressed information, a compressor and expander are further required.

In addition, the magnetic storage device 905 for storing the video information may be replaced by other random-accessible recording media, for example, a MO (magneto optical) disk storage unit.

The operation of each element of the video information editing system 900 will be described below.

First, the video information editing system 900 is powered on, so that the same operation and control window can be indicated on the display monitor as shown in FIG. 8 to bring about the editing start condition.

Then, the operator orders the VTR 904 to operate by use of the mouse (or keyboard) 908, so that necessary video information is reproduced from the loaded video tape. The video information is supplied through the video interface 903 and bus 909 to the random-accessible magnetic storage device 905, and stored therein.

In addition, the operator orders the magnetic storage device 905 to operate by use of the mouse (or keyboard) 908, causing it to supply the video information to the frame buffer memory 906.

The video information fed to the frame buffer memory 906 is indicated on the display monitor 907 as shown in FIG. 8. Thus, the video image data can be edited.

At this time, audio data is also similarly edited.

As an example of the video information editing method, slow speed reproduction of 7/30 time normal and fast speed reproduction of 69/30 times normal will be performed as described below.

First, the slow speed reproduction of 7/30 (≈0.23) time normal will be mentioned.

When the reproduction speed is as low as 7/30 time normal, it is necessary that image data of 7 frames be produced at a rate of 30 frames/second. Therefore, image data of 23 frames are required to be interpolated.

Thus, the output pattern of this data of 7 frames is determined (see step 102 in FIG. 4). In this case, the pattern is generally determined so that only particular portions of the output frames is not repeated much more times in the reproduction pattern.

Figure 2:
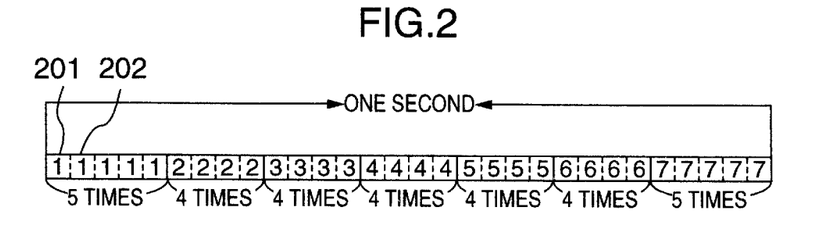
FIG. 2 shows an example of the reading pattern for producing video image data and audio data in the slow speed reproduction mode according to the embodiment of the video information editing method of the present invention.

FIG. 2 shows one example of the reading pattern to be used for producing video image data and audio data in the slow speed reproduction mode of 7/30 time normal. In FIG. 2, frame numbers are attached on the stream of video image data depicted in a form of long, narrow strip. When the video image data is read from the frame buffer memory 906 according to this pattern, each frame of the video image data can be reproduced substantially equal times.

As shown in FIG. 2, the outputting of the first frame is repeated five times, that of the second to sixth frames each four times, and that of the seventh frame five times, so that 30 frames in all are produced as the output pattern of video image data.

Figure 3A:
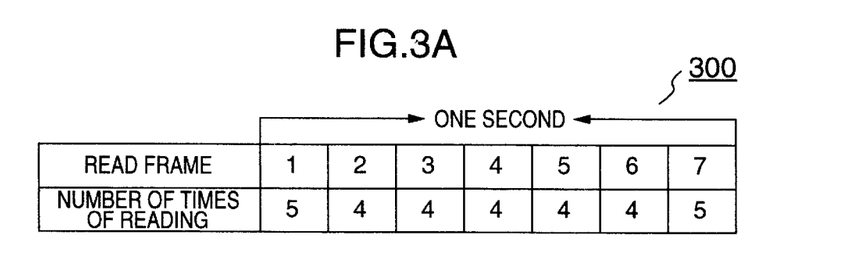
FIG. 3A shows a table of the video data reading pattern in the slow speed reproduction mode according to the embodiment of the video information editing method of the present invention.

The output pattern shown in FIG. 2 is stored as a repetition table 300 shown in FIG. 3A in a memory.

FIG. 3A shows a table with the frame numbers attached to the upper row at the positions corresponding to the frames to be read from the buffer memory 906 and with the repetition times attached to the lower row at the corresponding positions. In FIG. 3A, although only data of one-second duration is shown, the next data of one-second duration to be read according to this table is the eighth frame through fourteenth frame. Therefore, the frame numbers are renewed each data processing for one second.

The repetition table for the necessary output pattern, for example, table 300 is stored. For previewing the image reproduced in the slow speed mode of 7/30 time normal (see step 103 in FIG. 4), the operator clicks and drugs shuttles and push buttons on the editing working screen (FIG. 8) of the video information editing system. When a reproduction speed is specified (see step 104 in FIG. 4), the video information editing system causes the video image data stored in the hard disk unit to be processed according to the table 300 so that the outputting of the fist frame is repeated five times, that of the second frame four times, . . . , that of the seventh frame five times, and to be fed to the buffer memory 906.

The outputting of the eighth frame and the following frames are similarly repeated according to the table 300. Thus, the video image data can be reproduced in the slow speed mode of 7/30 time normal.

Then, the audio data is reproduced to match with the slow speed reproduction, or 7/30-time-normal speed reproduction of video image data as described below.

If it is assumed that the audio data is sampled at a sampling frequency of 44.1 kHz, 44,100 samples of data can be produced per second. Therefore, the number of samples of audio output per frame is $^{44,100}/_{30}$=1,470 samples/frame since the video image data repeats 30 frames per second.

In addition, since video image data of seven frames per second is repeated a plurality of times in the slow speed reproduction mode of 7/30 time normal, the total number of samples of the corresponding audio data of 7 frames is 7×1,470=10,290 samples/second.

Therefore, the 10,290 samples must be interpolated with other samples in order to match with the output sample number 44,100. The output pattern of audio data for the interpolation is produced according to the table generated for determining the video image data output frames, or for example, table 300.

Specifically, since the total sample numbers of the sound corresponding to seven frames outputted several times per second are 10,290 samples, the number of samples per 1/30 second (one frame period) is 10,290/30=343 samples.

Figure 1:
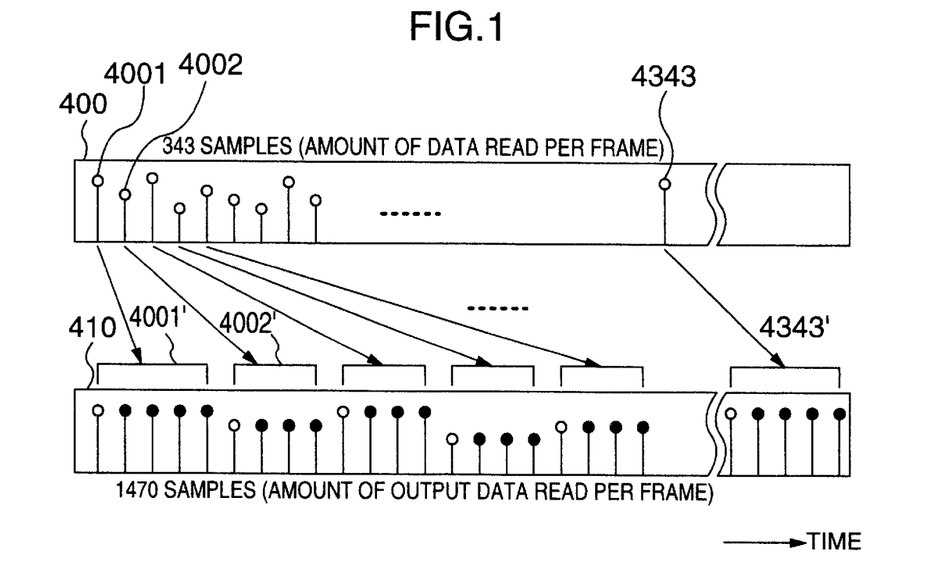
FIG. 1 is a diagram to which reference is made in explaining a method of generating an audio data reading pattern in the slow speed reproduction mode according to an embodiment of a video information editing method of the present invention.

FIG. 1 shows audio sample data 400 of one frame period, and audio sample data 410 of the slow speed reproduction mode read from the memory according to the order of the pattern in FIG. 2. The data samples, as indicated by small black circles, of the audio data 410 are generated by repeatedly reading the sample data indicated by small white circles at the each left side of them.

The first frame of video image data is read (see step 105 in FIG. 4), and produced as the first frame 201 of the repetition. In this cyclic processing, when audio data is produced to match with the frame 201, audio data of 343 samples from the beginning are read as shown by the pattern like the audio sample data 400 in FIG. 1 (see step 106 in FIG. 4).

Then, each of the 343 samples is processed for interpolation over each several units according to table 300.

In other words, as shown by the pattern like the audio sample data 410 in FIG. 1 after the interpolation process according to table 300, the first sample 4001 is repeated, or interpolated five times to form a sample group 4001', the second sample 4002 interpolated four times to form a sample group 4002', and similarly the following samples interpolated four times, four times, four times, four times, five times . . . respectively to finally form a sample group 4343' corresponding to the five-time interpolation of the 343rd sample 4343. Then, 1,470 samples of audio data can be produced to match with the number of audio samples per frame.

The interpolated data is not only produced so that the original data is copied for interpolation, but may be produced otherwise so that the adjacent samples can be smoothly changed in level, or that the frequency band of the reproduced audio signals can be narrowed by filtering etc. The filtering process will be described later.

If the interpolated audio data generated as above is produced in synchronism with the video image data, the first frame reproduction (preview) can be completed.

Thereafter, the second frame can be similarly processed. That is, when the video image data of the second frame is produced as the second frame 202 of the repetition, audio data of 343 samples beginning from the 344th sample are read, and processed in the same way as in the first frame, and the interpolated audio data is produced in synchronism with the video image data. Thus, the second frame reproduction can be completed.

By repeating this cyclic interpolate process, it is possible to reproduce both video image data and audio data in the slow mode of 7/30 time normal with good matching.

The fast speed reproduction of, for example, 69/30 (=2.3) times normal will be described below.

In the fast speed reproduction mode of 69/30 times normal, 30 frames of 69 frames per second are produced, and thus the difference, 39 frames resulting from subtracting 30 frames from 69 frames must be removed for thinning from the original data.

In this embodiment, a thinning pattern is employed as shown in FIG. 5. That is, the frames, 500 indicated by the white divisions, of 69 frames are produced by thinning. The frames 500 are produced, but the frames, 501 indicated by the shaded divisions are removed in such a way that the first, second and third frames are produced, the fourth frame is removed, and so on according to the white and shaded divisions.

Since video image data of 30 frames are thus produced by thinning over a period of 69 frames, 69/30-times-normal speed reproduction of video image data can be performed.

The thinning pattern (output pattern) shown in FIG. 5 is previously stored as a table in a memory like the slow reproduction mode.

Figure 11:
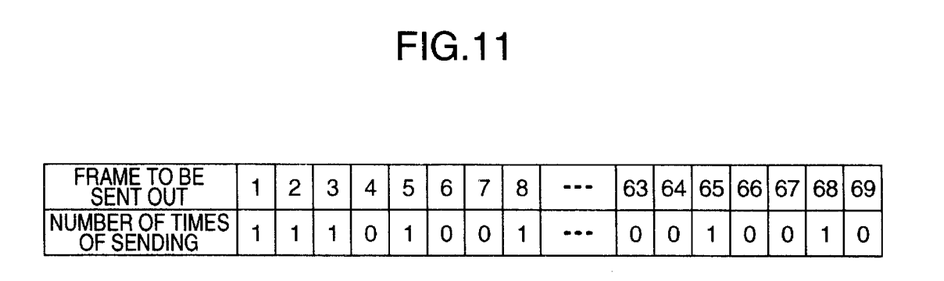
FIG. 11 shows a table of the video data reading pattern in the fast speed reproduction mode according to the embodiment of the video information editing method of the present invention.

FIG. 11 shows one example of the data table for storing the data reading pattern of fast speed mode of FIG. 5 in the memory. Frame numbers are attached to the divisions of the upper row of the data table, and binary values "1" and "0" are added to the corresponding divisions of the lower row, wherein "1" indicates to read data, and "0" not to read the frame data.

In addition, according to the video information editing method of the present invention, the audio data is produced at the speed matched with the 69/30-times-normal fast speed reproduction of the video image data as described below.

In the fast speed reproduction mode of 69/30 times normal, video image data is selected and produced from each 69 frames per second according to the reading table shown in FIG. 11.

As described above, since the sampling frequency of the audio data is 44.1 kHz, and since the number of samples of audio data per frame is 1,470, the total number of samples of audio data over a period of 69 frames is 69×1,470=101,430.

The number of samples to be outputted per one frame period for outputting from these data in a period corresponding to 30 frames or one second is 101,430/30=3,381 samples. From these samples, 1,470 samples to be actually outputted are extracted. That is, data of 3,381−1,470=1,911 samples are required to remove per frame.

Figure 6:
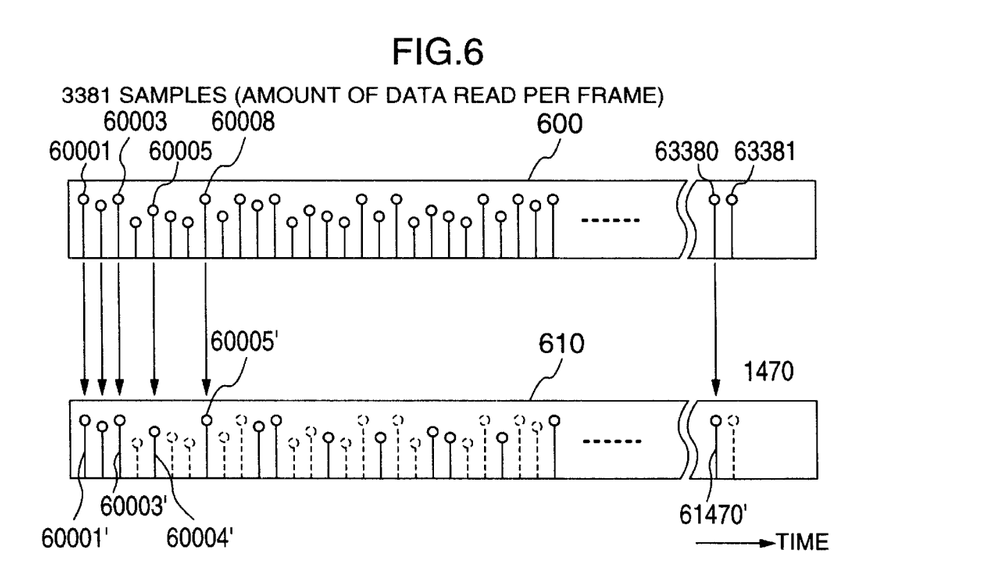
FIG. 6 is a diagram to which reference is made in explaining a method of generating an audio data reading pattern in the fast speed reproduction mode according to the embodiment of the video information editing method of the present invention.

FIG. 6 shows audio data 600 of 3,381 samples, and audio data 610 of the fast speed reproduction mode read from the memory in the order of the table shown in FIG. 11. The data indicated by dotted portions of audio data 610 are not read (are removed).

When video image data of the first frame is read (see step 105 in FIG. 4) and produced, the audio data of 3,381 samples from the beginning is read as shown by the audio data output pattern 600 in FIG. 6 (see step 106 in FIG. 4).

Then, these 3,381 samples are subjected to the thinning process according to the table pattern shown in FIG. 11 to form the audio output pattern 610 of 1,470 samples as indicated by the solid lines in FIG. 6.

When this output audio data is generated, the first, second and third samples 60001, 60002, 60003 are employed to be samples 60001', 60002', 60003', and the fourth sample 60004 is removed not to appear in the output pattern 610, according to the table pattern of FIG. 11.

When the samples up to the 3,381st sample 63381 are processed in this way, the audio data output of 1,470 samples from sample 60001' to sample 61470' is generated.

The audio data thus generated is produced in synchronism with the video image data, so that the first frame reproduction (preview) can be performed.

When the second frame and the following frames are processed in the same way, both video image data and audio data can be reproduced with good matching in the fast speed mode of 69/30 times normal.

Some forward reproduction modes have so far been described. A reverse speed reproduction mode of, for example, (−69/30) times normal will be mentioned below.

The table used for the fast reverse speed reproduction (−69/30 times normal) of the video image data is just the same table as that generated for the fast forward speed reproduction mode of 69/30 time normal, and the direction of the process is selected to be opposite to the time progression.

The audio data is produced at the speed matched with the fast reverse speed reproduction (−69/30 times normal) of the video image data according to the video information editing method of the present invention as described below.

The total number of samples and the number of samples per frame, of the audio data for the fast reverse speed reproduction (−69/30 times normal) are the same as those for the fast forward speed reproduction (69/30 times normal).

Figure 7:
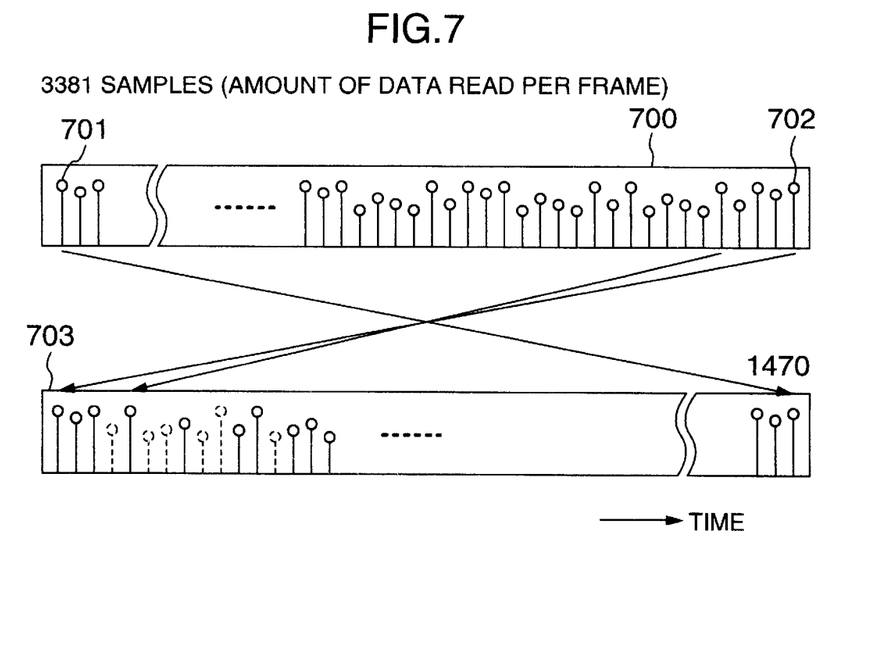
FIG. 7 is a diagram to which reference is made in explaining a method of generating an audio data reading pattern in the fast speed rewinding reproduction mode according to the embodiment of the video information editing method of the present invention.

FIG. 7 shows audio data 700 of 3,381 samples, and audio data 703 of the fast reverse speed reproduction mode read from the memory in the order opposite to that of FIG. 11. The data indicated by dotted lines in the audio data 703 are not read (are removed).

When the video image data of the first frame is read (see step 105 in FIG. 4) and produced as a cyclic processing, the 3,381 samples of audio data of the current frame are read in the order from the final sample 702 to the head sample 701 as shown in FIG. 7 by the audio output pattern 700 (see step 106 in FIG. 4).

Then, the 3,381 samples thus read are subjected to the thinning process in the order beginning from the last sample 702 side according to the table pattern shown in FIG. 11 to form the audio output data 703.

When all the 3,381 samples have been processed to form the audio output data 703, 1,470 samples are generated as audio output data.

When the audio output data thus generated is produced in synchronism with the video image data, the fast reverse speed reproduction of the first frame (preview) can be performed.

If the second frame and the following frames are similarly processed, both video image data and audio data can be reproduced with good matching in the fast reverse speed mode of (−69/30) times normal.

In this case, since the audio output data itself is data of reverse reproduction speed mode, the program for audio output may be the same as that for the forward speed reproduction mode.

If the data before interpolation is repeated a certain number of times specified by the repetition number table to make interpolation, harmonics are sometimes caused in the reproduced, interpolated audio data, deteriorating the sound quality. Therefore, values of certain repeated data are not made the same, or the frequency band of the reproduced audio signal is subjected to a filtering process to be narrowed or so that harmonics cannot be included in the audio signal.

Here, an example of the filtering process will be described with reference to the audio output pattern 410 of FIG. 1.

Figure 10:
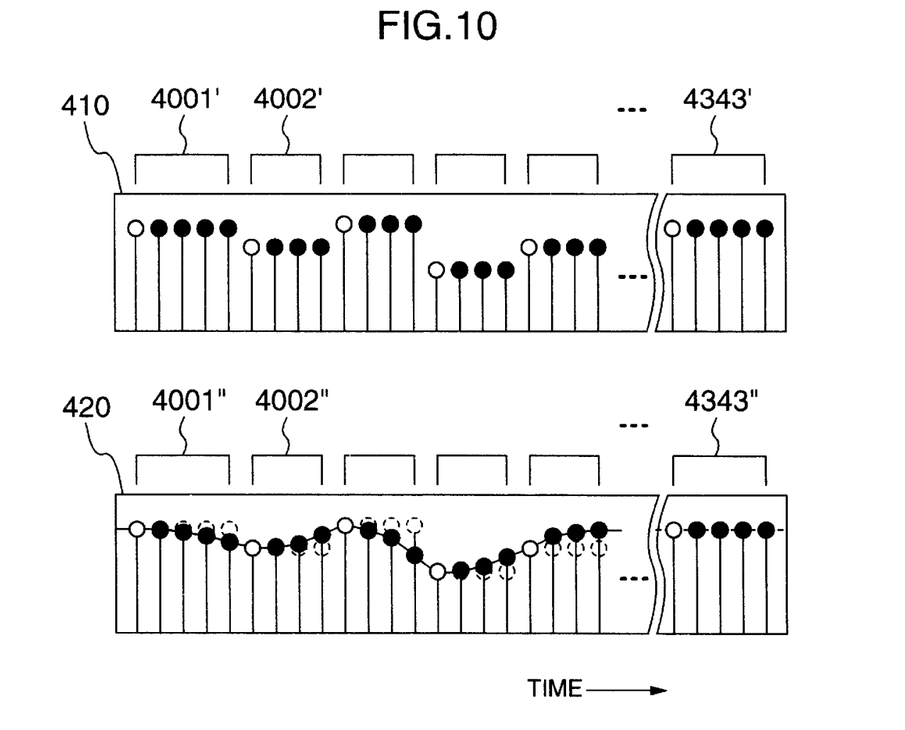
FIG. 10 is a diagram to which reference is made in explaining the filtering process for the read audio data according the embodiment of the video information editing method of the present invention.

FIG. 10 shows an output pattern 420 after the filtering process which is derived from the audio output pattern 410 generated by the video information editing method of the present invention. In FIG. 10, the audio output pattern 410 is the same as the audio output pattern 410 of FIG. 1.

The audio data generated according to the output pattern 410 is further subjected to the filtering process by digital filtering means. As a result, audio data having a narrower-band frequency characteristic can be generated as shown by the output pattern 420 in FIG. 10. This digital filtering means may be constructed by a data processing circuit of hardware logic or by use of a CPU and a memory with a digital filtering program provided so that the program can be executed for the filtering process by the CPU.

In addition, the audio data is not generated according to the output pattern 410, but may be produced according to the output pattern 420 from the audio data of output pattern 400.

As described above, since audio data is subjected to interpolation or thinning process according to the same table as that for video image output, the audio output data can be matched with the output pattern of video image data, and reproduced at the speed closer to that of video than in the prior art.

When a reproduction speed is specified arbitrarily by jog/shuttle or playback buttons, the above processes for this speed can be performed, and thus audio signals can be reproduced with variable speeds like the video tape recorder.

Figure 12:
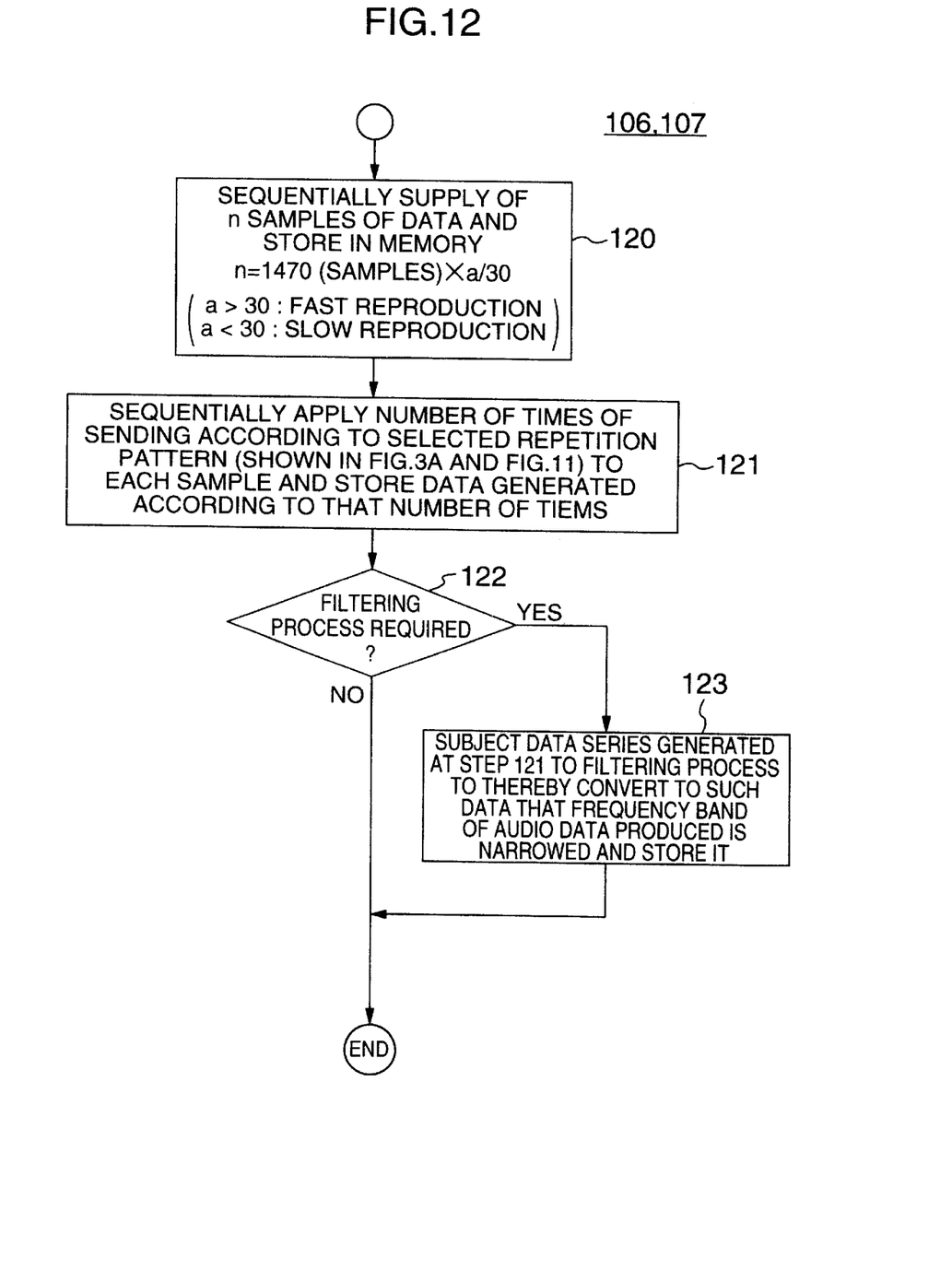
FIG. 12 is a flowchart of the process according to the embodiment of the video information editing method of the present invention.

FIG. 12 is a flowchart for more detailed description of audio data processing of steps 106 and 107 given in FIG. 4. At step 120, n samples of audio data are read from the magnetic disk unit 905 and stored in the buffer memory 906. Here, n=1,470×a/30, where when a>30 it indicates the fast speed reproduction mode, and when a<30 it indicates the slow speed reproduction mode. In addition, a/30 represents the ratio of reproduction speed to standard, or normal speed. At step 121, the data reading pattern table (FIG. 3A or FIG. 11) corresponding to the specified reproduction speed is read from the memory 902. The audio sample data is read from the buffer memory 906 in accordance with the data reading pattern table, and stored in another memory area. if decision is Yes at step 122, or if the audio output data is subjected to the filtering process, the program goes to step 123 where the audio data stored in the memory area is subjected to the process shown in FIG. 10, and the processed audio data is produced.

Figure 13:
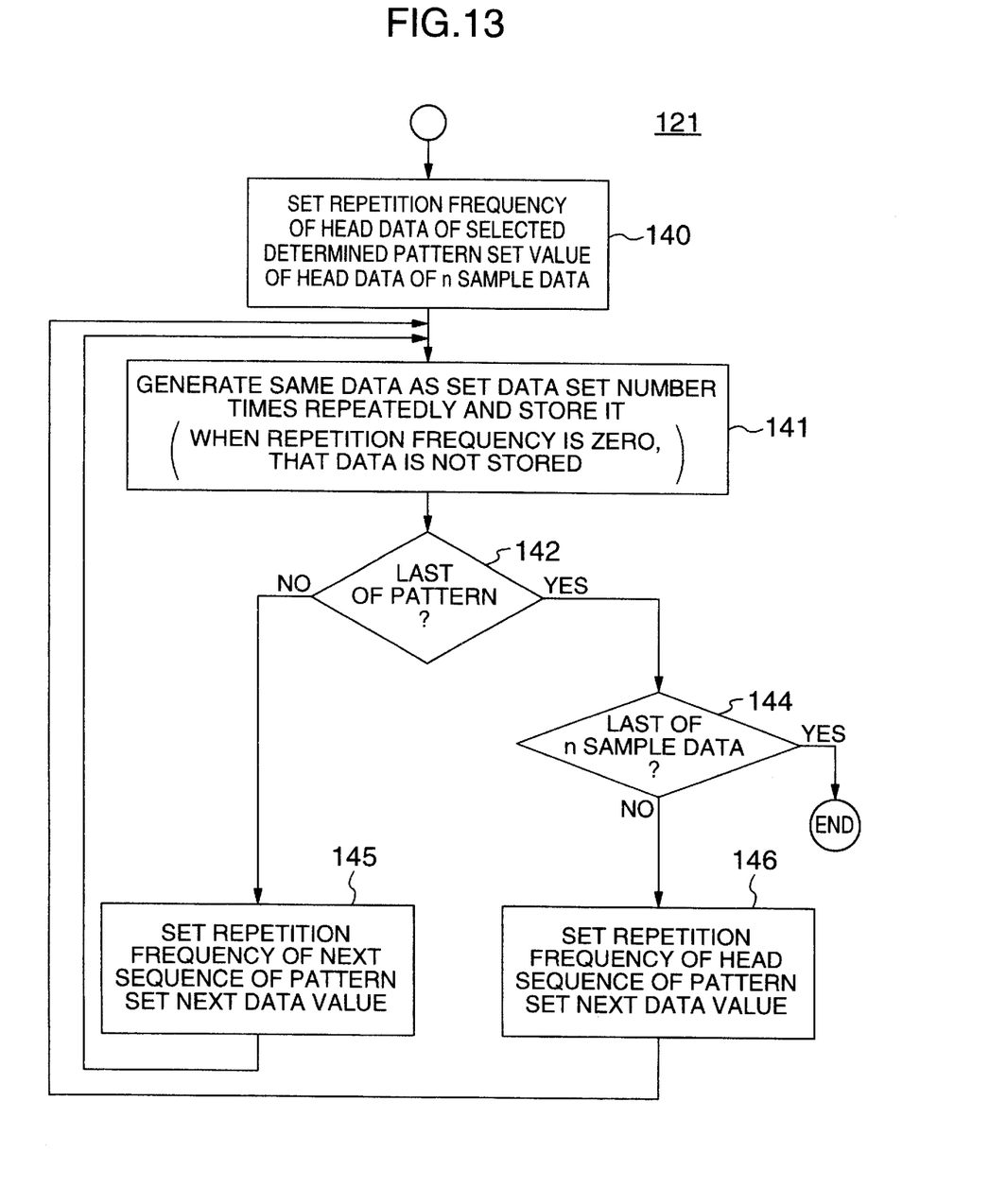
FIG. 13 is a flowchart of the process according to the embodiment of the video information editing method of the present invention.

FIG. 13 is a flowchart for more detailed description of the process of step 121 in FIG. 12. At step 140, the first repetition number is read from the reading pattern table. In addition, the head data value of n samples of audio data is fixed. The same data value as the fixed audio data is generated the first repetition number times, and stored in the memory area. If the repetition number is 0, that data is not stored. At step 142 (data thinning), decision is made of whether the current data is the last data of the table. If the current data is not the last data of the table, the program goes to step 145 where the next repetition number of the reading pattern is set, and the next sample data is set. Then, the program goes back to step 141, where the next data is similarly processed. At step 142, if the current data is decided to be the last data of the table, the program goes to step 144 where decision is made of whether the current data is the last (n-th) one of the n samples of data or not. If the current data is not the last sample data, the program goes to step 146 where the first repetition number of the reading pattern is set, and the next sample data is set. Then, the program goes back to step 141 where the next sample data is read and processed.

The programs of the steps of the flowcharts shown in FIGS. 4, 12 and 13 are recorded on the recording media in a form of digital codes which can be read by the computer. The recording media may be, for example, magnetic disks, optical disks or semiconductor memory.

According to the present invention, in the video information editing method and system, the output order pattern table is generated for editing the video frame data, and the generated table is also used as a table for editing audio data of at least several units per sample so that the audio data and video image data can be produced with the same pattern. Thus, since the video image data and audio data output patterns can be matched with each other, the moving picture composed of video image data and audio data can be edited with good matching, and the reproduced sound has no feeling of wrongness and can be greatly suppressed from being interrupted.

In the above disclosed embodiments, the same table is used for editing of image data and audio data. In this case, the data area for storing the table in a memory can be saved. The data area can be reduced by half as compared with the individual tables are provided for editing of image data and audio data. Further, a device for producing the table can be simplified or deleted by using a common table.

Figure 3B:
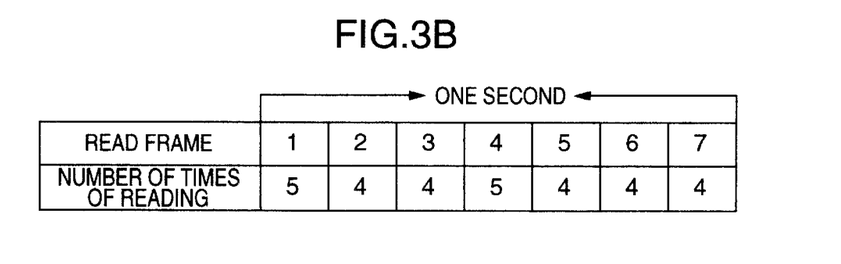
FIG. 3B shows a table of the audio data reading pattern used together with the table shown in FIG. 3A in the slow speed reproduction mode.

However, according to the present invention, the individual tables can be prepared and used for editing of image data and audio data. In this case, the patterns of tables for data reading of image data and audio data may be different from each other. For example, for slow speed reproduction mode (7/30 times normal) the image data is read out in accordance with the table as shown in FIG. 3A, and the audio data is read out in accordance with the table as shown in FIG. 3B. The tables shown in FIGS. 3A and 3B are different in number of times for data reading at the frame numbers 4 and 7. The number of times for data reading at frame numbers 4 and 7 are exchanged between FIGS. 3A and 3B. These two different tables provide the same reproduction speed for the image data and audio data and while the reproduced sound is consistent with the reproduced image. If the viewer is not aware of the variation of data interpolation in the reproduced image, different tables for image data and audio data can be used. Individual tables for image data and audio data are also be used in fast speed reproduction mode in a same manner as the slow speed reproduction mode.

What is claimed is:

1. A method of editing digital video information including video image frame data and audio sample data, comprising the steps of:

selecting a frame reading pattern from a plurality of reproduction patterns in accordance with a predetermined reproduction mode of video image data;

reading said video image frame data from a video image data source according to said selected frame reading pattern;

reading audio sample data from an audio data source so as to match said audio sample data with said video image frame data based on the selected frame reading pattern;

reproducing the read video image frame data at a predetermined frame rate; and reproducing the read audio sample data in synchronism with the reproduced video image frame data, wherein when said step of reproducing the read video image frame data is a slow speed reproduction mode, said video image frame data is read a plurality of times repeatedly from said video image data source according to said the selected frame reading pattern so that said video image frame data can be interpolated with data to be reproduced at said predetermined frame rate, each sampling pitch unit of audio sample data of one frame stored in said audio sample data source is read a plurality of times repeatedly to form audio sample data corresponding to one frame period of the reproduced video image frame data, and an operation for generating audio sample data of one frame is repeatedly performed for each frame, and wherein said frame reading pattern includes data indicating the order in which said video image data is read according to frame number, and the number of times that said video image data is read, said audio sample data of one frame period stored in said audio data source is read according to the order in which said video image data is read and the number of times that said video image data is read.

2. A method of editing digital video information including video image frame data and audio sample data, comprising the steps of:

selecting a frame reading pattern from a plurality of reproduction patterns in accordance with a predetermined reproduction mode of video image data;

reading said video image frame data from a video image data source according to said selected frame reading pattern;

reading audio sample data from an audio data source so as to match said audio sample data with said video image frame data based on the selected frame reading pattern;

reproducing the read video image frame data at a predetermined frame rate; and reproducing the read audio sample data in synchronism with the reproduced video image frame data, wherein when said step of reproducing the read video image frame data is a fast speed reproduction mode, video image frame data of more than one frame is read from said video image frame data source, the read video image frame data is subjected to a thinning process according to said the selected frame reading pattern so that said video image frame data can be reproduced at said predetermined frame rate, audio sample data of more than one frame period stored in said audio sample data source is read, the read audio sample data is subjected in its sampling pitch units to a thinning process to form audio sample data corresponding to one frame period of the reproduced video image frame data, and said operation for thinning said audio sample data is repeated for each frame, and wherein said frame reading pattern includes data indicating the order in which said video image frame data is read according to frame number, and the frame numbers of video image frame data which are not read, and audio sample data of one frame period stored in said audio data source is read according to the order in which said video image frame data is read and the frame number of video image frame data which are not read.

3. A method of editing digital video information including video image frame data and audio sample data, comprising the steps of:

selecting a frame reading pattern from a plurality of reproduction patterns in accordance with a predetermined reproduction mode of video image frame data;

reading said video image frame data from a video image data source according to said selected frame reading pattern;

reading audio sample data from an audio data source so as to match said audio sample data with said video image frame data based on the selected frame reading pattern;

reproducing the read video image frame data at a predetermined frame rate; and reproducing the read audio sample data in synchronism with said produced video image frame data, wherein said frame reading pattern includes data indicating the order in which said video image data is read according to frame number and the number of times that said video image data is read in order to be interpolated with data at said predetermined frame rate, said audio sample data of one frame period stored in said audio data source is read according to the order in which said video image data is read and the number of times that said video image data is read.

4. A method of editing digital video information including video image frame data and audio sample data, comprising the steps of:

selecting a frame reading pattern from a plurality of reproduction patterns in accordance with a predetermined reproduction mode of video image frame data;

reading said video image frame data from a video image data source according to said selected frame reading pattern;

reading audio sample data from an audio data source so as to match said audio sample data with said video image frame data based on the selected frame reading pattern;

reproducing the read video image frame data at a predetermined frame rate; and reproducing the read audio sample data in synchronism with said produced video image frame data, wherein said frame reading pattern includes data indicating the order in which said video image data is read according to frame number and the frame numbers of video frames which are not read, and said audio sample data of one frame period stored in said audio data source is read according to the order in which said video image data is read and the frame number of video frames which are not used.

* * * * *